US012623633B2

(12) United States Patent
Shen et al.

(10) Patent No.: US 12,623,633 B2
(45) Date of Patent: May 12, 2026

(54) VEHICLE CAMERA LENS OBSTRUCTION

(71) Applicant: GM GLOBAL TECHNOLOGY OPERATIONS LLC, Detroit, MI (US)

(72) Inventors: Jiabin Shen, Burnaby (CA); Jay Blackwell, Detroit, MI (US); Yun Qian Miao, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 303 days.

(21) Appl. No.: 18/465,681

(22) Filed: Sep. 12, 2023

(65) Prior Publication Data

US 2025/0083642 A1      Mar. 13, 2025

(51) Int. Cl.
| | |
|---|---|
| B60S 1/08 | (2006.01) |
| B60S 1/48 | (2006.01) |
| B60S 1/56 | (2006.01) |
| G06T 7/579 | (2017.01) |
| G06T 15/04 | (2011.01) |

(52) U.S. Cl.
CPC ............. B60S 1/0848 (2013.01); B60S 1/485 (2013.01); B60S 1/566 (2013.01); G06T 7/579 (2017.01); G06T 15/04 (2013.01); *G06T 2207/10016* (2013.01); *G06T 2207/30252* (2013.01)

(58) Field of Classification Search
CPC ...... H04N 23/52; H04N 23/81; H04N 23/811; G06T 7/579; G06T 15/04; G06T 2207/10016; G06T 2207/30252; B60S 1/0848; B60S 1/485; B60S 1/566; B60S 1/46; G06V 20/56
See application file for complete search history.

(56) References Cited

U.S. PATENT DOCUMENTS

| | | | | |
|---|---|---|---|---|
| 4,645,459 | A * | 2/1987 | Graf ................. | H04N 21/47205 |
| | | | | 345/426 |
| 11,348,269 | B1 * | 5/2022 | Ebrahimi Afrouzi ... | G01S 17/48 |
| 11,531,197 | B1 * | 12/2022 | Grisleri ................ | H04N 23/682 |
| 2014/0232869 | A1 * | 8/2014 | May ..................... | H04N 23/811 |
| | | | | 348/148 |
| 2016/0307054 | A1 * | 10/2016 | Takemura ............ | H04N 23/811 |
| 2020/0086791 | A1 * | 3/2020 | Hardy ................... | G06T 5/50 |
| 2020/0273153 | A1 * | 8/2020 | Hiramaki ............... | G06T 5/60 |
| 2021/0192745 | A1 * | 6/2021 | Kahlbaum ............. | G06T 7/254 |
| 2023/0068848 | A1 | 3/2023 | Alismail | |
| 2023/0145395 | A1 * | 5/2023 | Giraud ................. | B60S 1/56 |
| | | | | 701/36 |

OTHER PUBLICATIONS

Office Action dated May 14, 2024 from German Patent Office for German Patent No. 102023131158.1; 4pgs.

* cited by examiner

*Primary Examiner* — Twyler L Haskins
*Assistant Examiner* — John H Morehead, III

(57) ABSTRACT

A method for processing vehicle camera lens obstructions including obtaining an image from a vehicle camera, generating a first camera lens dirt map according to pixel texture richness and color spectrum levels extracted from the image, obtaining a sequential feed of multiple frames from the vehicle camera, generating a second camera lens dirt map according to at least one salient region extracted from the multiple frames, combining the first camera lens dirt map and the second camera lens dirt map to generate a combined camera lens dirt map, and initiating at least one of automated lens cleaning or a camera lens obstruction signal, according to the combined camera lens dirt map.

20 Claims, 6 Drawing Sheets

801

803

804

VEHICLE CAMERA LENS OBSTRUCTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle camera lens obstruction, including detection of an obstruction of the vehicle camera lens to control automated lens cleaning and other vehicle control features.

Some vehicles include cameras, such as rear vehicle cameras that provide a camera feed for drivers while backing up. Other vehicle systems may use camera images to sense surroundings and to control different vehicle functions, such as audible alerts when an object is detected in close proximity behind the vehicle. Sometimes dirt or other debris may collect on a lens of the vehicle camera, negatively impacting systems that rely on accurate images captured from the vehicle camera.

SUMMARY

A method for processing vehicle camera lens obstructions including obtaining an image from a vehicle camera, generating a first camera lens dirt map according to pixel texture richness and color spectrum levels extracted from the image, obtaining a sequential feed of multiple frames from the vehicle camera, generating a second camera lens dirt map according to at least one salient region extracted from the multiple frames, combining the first camera lens dirt map and the second camera lens dirt map to generate a combined camera lens dirt map, and initiating at least one of automated lens cleaning or a camera lens obstruction signal, according to the combined camera lens dirt map.

In other features, initiating automated lens cleaning includes at least one of dispensing a cleaning solution to a lens of the vehicle camera or moving a wiper across a surface of the lens.

In other features, initiating the camera lens obstruction signal includes alerting at least one vehicle movement control system of an obstruction of a lens of the vehicle camera, to inhibit generation of at least one of automated vehicle braking or audible alerts according to input received from the vehicle camera.

In other features, the method includes extracting texture sub-areas of the image, discretizing an image blurriness level according to the pixel texture richness of the texture sub-areas, and extracting color spectrum sub-areas of the image, wherein the first camera lens dirt map is generated by combining the image blurriness level and the color spectrum sub-areas.

In other features, the method includes extracting and tracking the at least one salient region in the multiple frames, and detecting at least one blockage area of the vehicle camera according to the at least one salient region, wherein the second camera lens dirt map is generated according to the at least one blockage area.

In other features, the method includes obtaining at least one vehicle motion signal, and generating a timeline of pixel statistics in the multiple frames, according to the at least one vehicle motion signal, wherein the at least one salient region is tracked according to the timeline of pixel statistics in the multiple frames, and wherein at least one blockage area is detected according to the timeline of pixel statistics in the multiple frames.

In other features, tracking the at least one salient region includes identifying a location in the multiple frames where detected objects repeatedly disappear during vehicle motion.

In other features, the at least one vehicle motion signal includes at least one of a steering wheel rotation signal and a wheel speed sensor signal. In other features, combining the first camera lens dirt map and the second camera lens dirt map includes applying a weighted average to the first camera lens dirt map and the second camera lens dirt map to generate the combined camera lens dirt map.

In other features, obtaining the image includes obtaining the image from a raw camera feed of the vehicle camera, and generating the first camera lens dirt map includes generating an information map based on the image from the raw camera feed, and determining a valid perception region based on the information map. In other features, the vehicle camera comprises a rear vehicle backup camera.

A vehicle camera lens obstruction detection system includes a vehicle camera mounted on a vehicle, the vehicle camera including a lens, and the vehicle camera configured to capture images, and a vehicle control module in communication with the vehicle camera, the vehicle control module configured to receive a sequential feed of multiple frames from the vehicle camera, extract and track at least one salient region in the multiple frames, detect at least one blockage area of the vehicle camera according to the at least one salient region, generate a camera lens dirt map according to the at least one blockage area, and initiate at least one of automated lens cleaning or a camera lens obstruction signal, according to the camera lens dirt map.

In other features, the vehicle control module is configured to obtain at least one vehicle motion signal, and generate a timeline of pixel statistics in the multiple frames, according to the at least one vehicle motion signal, wherein the at least one salient region is tracked according to the timeline of pixel statistics in the multiple frames, and wherein at least one blockage area is detected according to the timeline of pixel statistics in the multiple frames.

In other features, the vehicle control module is configured to track the at least one salient region by identifying a location in the multiple frames where detected objects repeatedly disappear during motion of the vehicle.

In other features, the at least one vehicle motion signal includes at least one of a steering wheel rotation signal and a wheel speed sensor signal. In other features, initiating automated lens cleaning includes at least one of dispensing a cleaning solution to a lens of the vehicle camera or moving a wiper across a surface of the lens.

In other features, initiating the camera lens obstruction signal includes alerting at least one vehicle movement control system of an obstruction of a lens of the vehicle camera, to inhibit generation of at least one of automated vehicle braking or audible alerts according to input received from the vehicle camera. In other features, the vehicle camera comprises a rear vehicle backup camera.

A vehicle camera lens obstruction detection system includes a vehicle camera mounted on a vehicle, the vehicle camera including a lens, and the vehicle camera configured to capture images, and a vehicle control module in communication with the vehicle camera, the vehicle control module configured to receive an image from the vehicle camera, extract texture sub-areas of the image, discretize an image blurriness level according to pixel texture richness of the texture sub-areas, extract color spectrum sub-areas of the image, generate a camera lens dirt map according to the pixel texture richness of the texture sub-areas and the color spectrum sub-areas of the image, and initiate at least one of automated lens cleaning or a camera lens obstruction signal, according to the camera lens dirt map.

In other features, initiating automated lens cleaning includes at least one of dispensing a cleaning solution to a lens of the vehicle camera or moving a wiper across a surface of the lens, and initiating the camera lens obstruction signal includes alerting at least one vehicle movement control system of an obstruction of a lens of the vehicle camera, to inhibit generation of at least one of automated vehicle braking or audible alerts according to input received from the vehicle camera.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicle cameras are sometimes obstructed by dirt, water or other debris. Some example embodiments described herein implement a lightweight computation method to detect obstructed areas or regions of a vehicle camera lens, and provide obstruction detection signals to support vehicle camera viewing functions, cleaning functions, perception features, etc. The obstructed areas may include blockages of at least a portion of the vehicle camera lens due to particles from dirt, water, snow, ice, mud, etc., which may be generally referred to as lens dirt areas or a lens dirt map.

An example detection algorithm includes two components for detecting obstructed vehicle camera lens areas, although other example embodiments may use each component individually, or combine the component(s) with other detection features. For example, in a stationary vehicle case (or when a single camera image is obtained), texture richness and color spectrum levels may be extracted from the camera image and used for estimation of vehicle camera lens obstruction.

In various implementations, a vehicle camera depth-of-field may be greater than zero (such as about 20 centimeters, etc.), and normal nature scenes of the ground and vehicle surroundings are texture-rich. Therefore, a vehicle control module may be configured to detect areas in a captured camera image frame having a high level of blurriness and lack of color as obstructed areas of the vehicle camera lens.

In some example embodiments, a vehicle control module may be configured to estimate camera lens obstructions while the vehicle is moving, based on tracking salient areas of multiple camera frames in combination with vehicle motion signals. For example, when the vehicle motion signals indicate a known motion of the vehicle, a vehicle control module may track salient areas in the camera multi-frames and/or track salient areas between multi-cameras as a strong indicator of a camera lens obstruction (e.g., dirt blockage).

Figure 1:
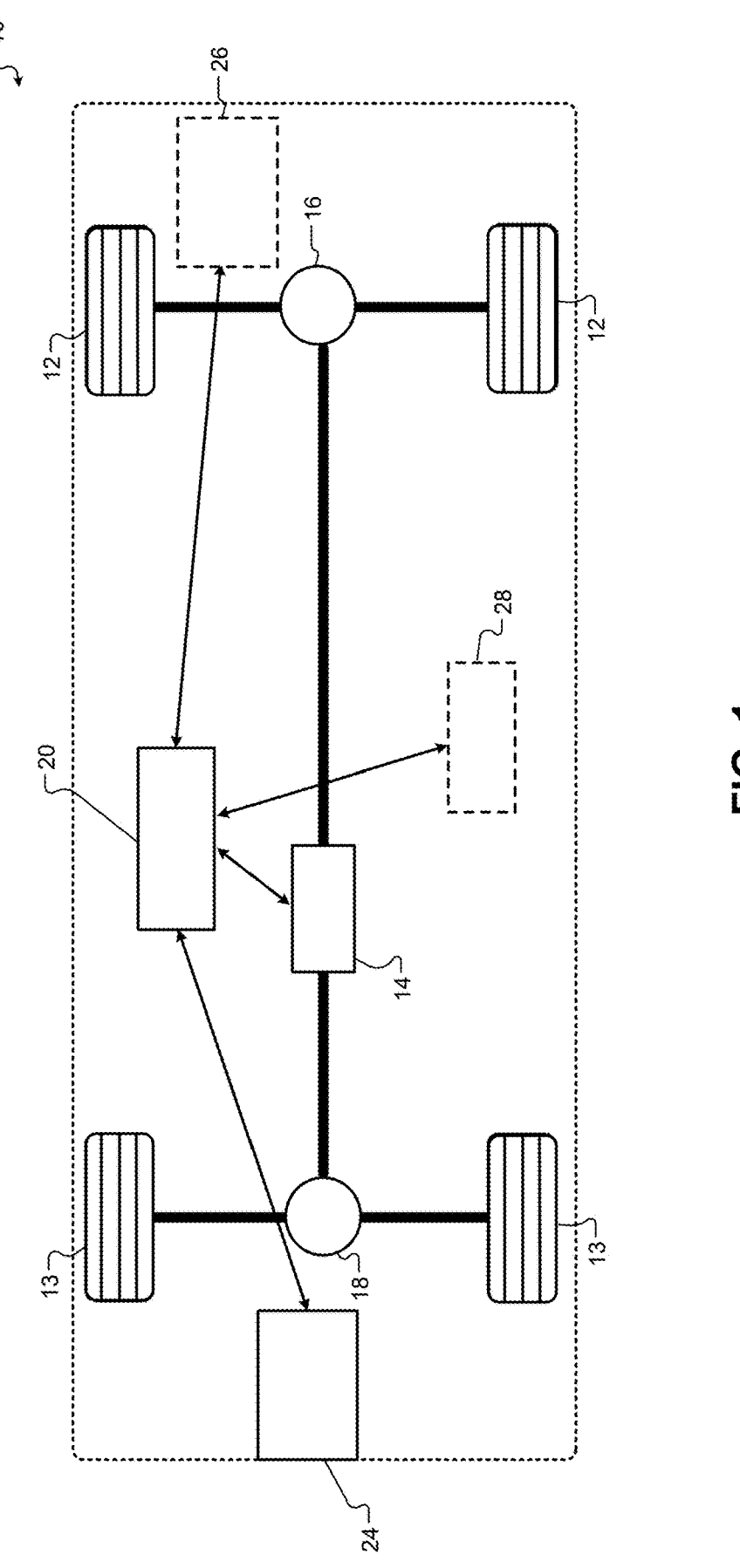
FIG. 1 is a diagram of an example vehicle including a vehicle control module configured to detect a vehicle camera lens obstruction.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration pedal, a brake pedal, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, wheel position sensors, location sensors such as global positioning system (GPS) antennas, etc.). Some sensors may be configured to monitor current motion of the vehicle, acceleration of the vehicle, steering torque, etc.

As shown in FIG. 1, the vehicle 10 includes a rear vehicle camera 24, an optional front vehicle camera 26, and an optional side vehicle camera 28. In various implementations, the vehicle 10 may include more or less (or none) of any one of these vehicle camera. Each vehicle camera may include any suitable camera lens and image capture components, may optionally be associated with a laser, lidar sensor, etc.

The vehicle cameras may be used to detect objects around the vehicle 10. In some example embodiments, vehicle camera(s) may be configured to detect a closest in-path vehicle (CIPV) (e.g., another vehicle in front of a current driving path of the vehicle 10), a vulnerable road user (VRU) (e.g., a pedestrian or cyclist), may be implemented as backup cameras for controlling automated braking or audible alerts while the vehicle is traveling in reverse, etc.

Data obtained from the vehicle cameras may be used to control automated vehicle motion control features, such as automated acceleration and braking based on sensed objects or vehicles around the vehicle 10. In some situations, a lens of the vehicle camera may become obstructed (due to dirt, water, snow, ice, etc.), which could negatively impact vehicle control functions if the vehicle control module 20 is not able to receive clear images from the vehicle camera.

In various embodiments, an automated lens cleaning system may be controlled via a signal from the vehicle control module 20. For example, a cleaning solution may be released onto the camera lens or sprayed onto the camera lens in response to a control signal from the vehicle control module 20, a wiper or other component may move across a surface of the lens in response to a control signal, a heater may be activated to melt snow or ice on the lens, etc.

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

The vehicle 10 also includes a user interface. The user interface may include any suitable displays (such as on a dashboard, a console, or elsewhere), a touchscreen or other input devices, speakers for generation of audio, etc. In some example embodiments, the vehicle control module 20 may be configured to provide a visual notification of a recommended evasive steering maneuver on the user interface, and/or generate an audio alert of the recommended evasive steering maneuver.

Figure 2:
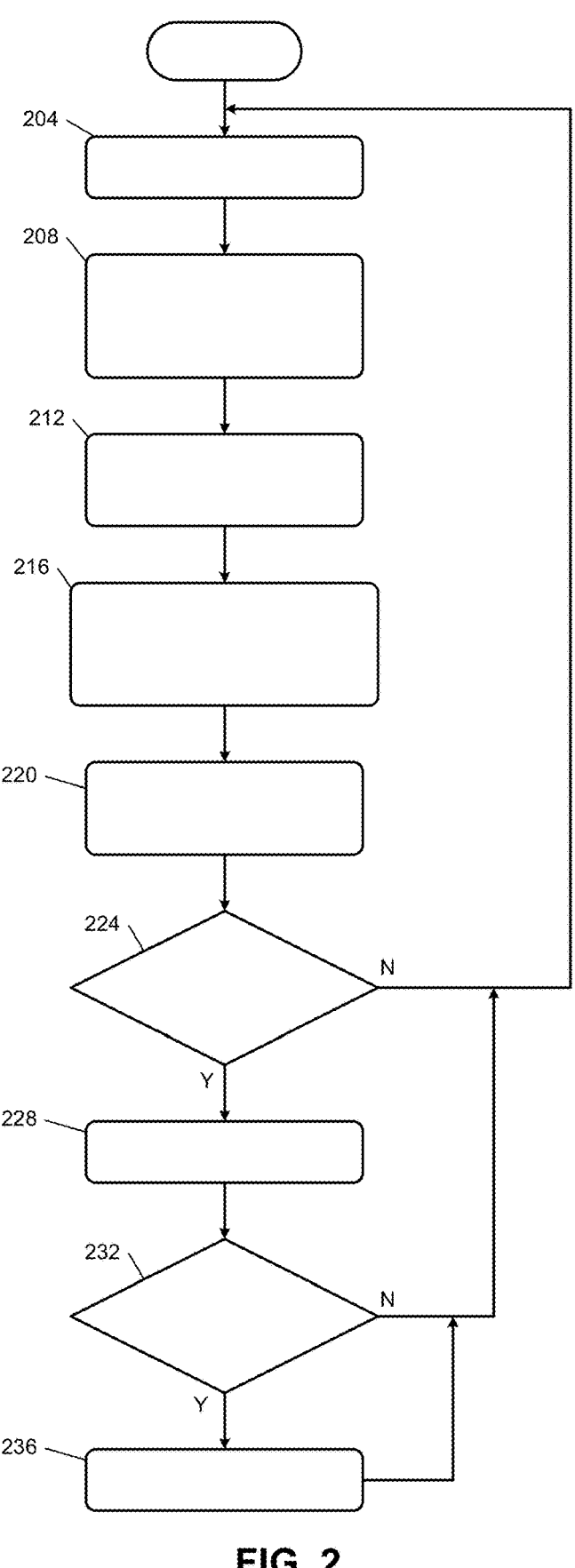
FIG. 2 is a flowchart depicting an example process for detecting a lens obstruction of a vehicle camera.

FIG. 2 is a flowchart depicting an example process for detecting a lens obstruction of a vehicle camera. The process may be performed by, for example, the vehicle control module 20 of FIG. 1. At 204, the process begins by obtaining an image from a vehicle camera, such as an image captured by the rear vehicle camera 24 of FIG. 1. In some example embodiments, the image may be a single static frame captured by the vehicle camera.

At 208, the vehicle control module is configured to generate a first camera lens dirt map according to extracted image features. For example, one or more features may be extracted (e.g., analyzed, determined, obtained, etc.) from the image, such as blurriness levels, pixel texture richness areas (e.g., sub-areas of the image), color spectrum levels (e.g., sub-areas with various color spectrums), etc.

Further details of generating the first camera lens dirt map are described further below with reference to FIG. 3. The camera lens dirt map may refer generally to a map of predicted obstruction regions of the camera lens, which may be due to particles from dirt, mud, water, snow, ice, etc.

At 212, the vehicle control module is configured to obtain a sequential feed of multiple frames from the vehicle camera. For example, the vehicle control module may receive a video from the rear vehicle camera 24, which includes multiple sequential frames. The multiple sequential frames may include any suitable number of frames (such as at least ten frames, at least 100 frames, etc.), or may include a number of frames for a fixed time period (such as one second of frames, ten seconds of frames, one minute of frames, etc.). The frames may be selected at periodic intervals, such as selecting one of every five image frames received from the vehicle camera, one of every twenty image frames received from the vehicle camera, etc.

At 216, control is configured to generate a second camera lens dirt map according to features extracted from the multiple frames. Additional details of generating the second camera lens dirt map according to features extracted from the multiple frames are described further below with reference to FIG. 4.

The vehicle control module is configured to combine the first camera lens dirt map and the second camera lens dirt map at 220. In this manner, lens obstructions may be accurately detected by combining analysis of features extracted from a single static image, in combination with features determined from a sequence of frames (e.g., a video) to analyze motion of objects throughout the frames.

Figure 3:
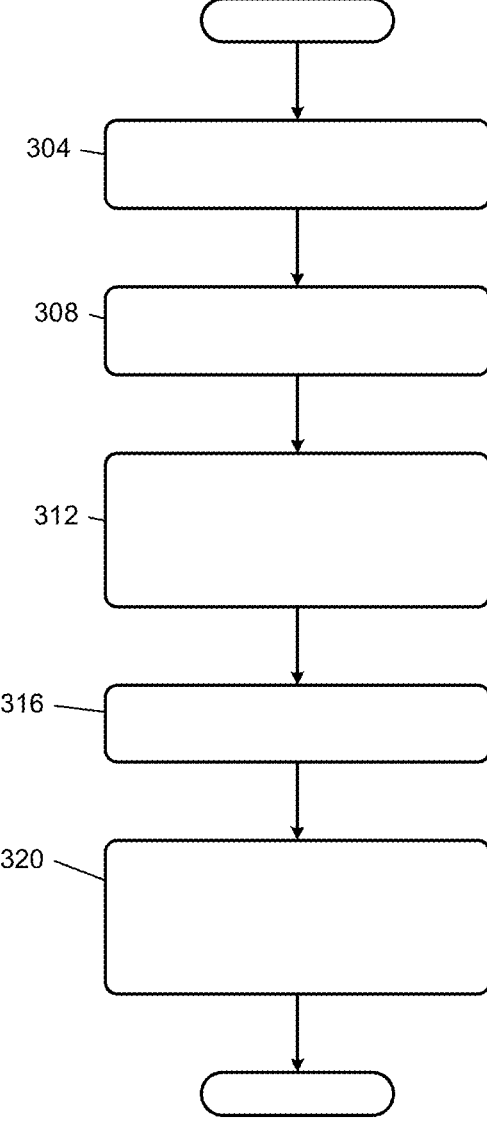
FIG. 3 is a flowchart depicting an example process for detecting a lens obstruction according to a single camera image.
Figure 4:
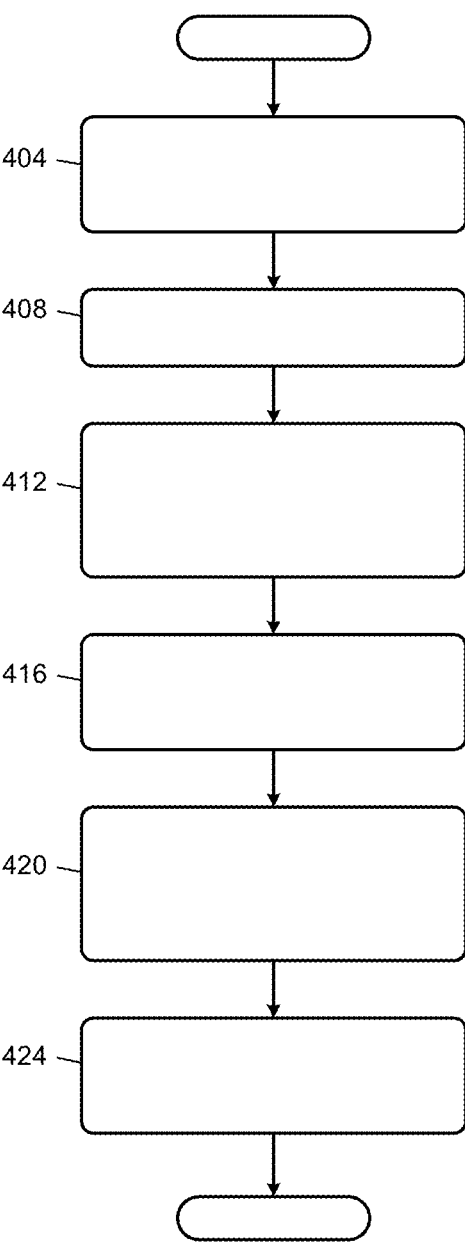
FIG. 4 is a flowchart depicting an example process for detecting a lens obstruction according to a sequential feed of multiple vehicle camera frames.

In other example embodiments, a lens obstruction may be detected using only analysis of the single static image (e.g., as described and illustrated in FIG. 3), or a lens obstruction may be detected using only analysis of the sequence of multiple frames (e.g., as described and illustrated in FIG. 4).

At 224, the vehicle control module is configured to determine whether the combined map indicates a lens obstruction is present. For example, if at least one blocked region is identified (e.g., due to a blocked or invalid perception region in the processed image map data), the vehicle control module may determine that at least a portion of the lens is obstructed. Although FIG. 2 illustrates determining whether there is a lens obstruction based on the combined map, in other example embodiments the determination of a lens obstruction may be based on only analysis of the single static image (e.g., as described and illustrated in FIG. 3), or a lens obstruction may be determined based on only analysis of the sequence of multiple frames (e.g., as described and illustrated in FIG. 4).

If control determines at 224 that no lens obstruction is present, control returns to 204 to obtain another image from the vehicle camera. The lens obstruction checks may be performed at specified periodic intervals, such as every second, every minute, every hour, etc.

If control determines at 224 that the combined map indicates a lens obstruction, control proceeds to 228 to initiate a camera lens obstruction signal. The camera lens obstruction signal may indicate to other vehicle systems that there is currently a blockage of at least a portion of the vehicle camera image, so the other systems may not reliably use the vehicle camera image for control functions. For example, a rear braking system may not rely only on the camera image for determining whether an object is present behind the vehicle to control automated braking or audible alert generation.

At 232, control determines whether an automated lens cleaning system is equipped for the vehicle. If so, control initiates automated vehicle camera lens cleaning at 236. For example, the vehicle control module may send a control signal to spray a cleaning solution on the lens of the vehicle camera, may activate a wiper to wipe off a surface of the lens of the vehicle camera, etc.

FIG. 3 is a flowchart depicting an example process for detecting a lens obstruction according to a single camera image. The process may be performed by, for example, the vehicle control module 20 of FIG. 1. At 304, the process begins by obtaining an image from a vehicle camera.

At 308, the vehicle control module is configured to extract texture sub-areas of the image. Control then discretizes an image blurriness level according to pixel texture richness of the texture sub-areas at 312. For example, an image texture may include one or more metrics calculated via image processing in order to quantify a perceived texture of an image. The pixel image texture may provide information about the spatial arrangement of color or intensities in an image, or selected region of the image, such as by using segmentation or classification to identify, e.g., spatial frequency, average grey level, etc.

At 316, the vehicle control module is configured to extract color spectrum sub-areas of the image. For example, color spectrum information may be obtained by performing image processing on the image to obtain locations of color values, a range of color values used in the image, color patterns or matching in the image, etc.

The vehicle control module is configured to generate the camera lens dirt map according to pixel texture richness and color spectrum levels at 320. This camera lens dirt map may be used on its own to determine whether a lens obstruction is present, or may be combined with a camera lens dirt map based on a sequence of images as described in FIG. 2.

FIG. 4 is a flowchart depicting an example process for detecting a lens obstruction according to a sequential feed of multiple vehicle camera frames. The process may be performed by, for example, the vehicle control module 20 of FIG. 1. At 404, the process begins by obtaining a sequential feed of multiple frames from a vehicle camera.

At 408, control obtains at least one vehicle motion signal. For example, the vehicle control module may receive a steering wheel rotation value, a wheel speed sensor value, etc. At 412, the vehicle control module is configured to generate a timeline of pixel statistics in the multiple frames, according to a vehicle motion sensor. For example, the vehicle control module may obtain statistics of the multiple frames via image processing, and correlate the image statistics with detected motion of the vehicle at different points in time.

The vehicle control module is configured to extract and track at least one salient region in the multiple frames, at 416. For example, the vehicle control module may be configured to process the multiple frames to determine an expected path of object in the frames. If a rock is detected in a rear vehicle camera as the vehicle is moving forward, the vehicle control module may expect the rock to move further away and get smaller in the image as the vehicle moves forward.

If the vehicle control module detects that the identified object (e.g., rock) disappears from the image sooner than expected, it may determine that a lens obstruction exists at the region of disappearance. If multiple objects keep disappearing unexpectedly at a same location in the multiple frames, the vehicle control module may provide an increased confidence that a lens obstruction exists at the same location.

At 420, control detects at least one blockage area of the vehicle camera according to the at least one salient region. For example, as mentioned above, if the vehicle control module identifies a region of the image where tracked object disappear unexpectedly as the vehicle moves, control may determine that a blockage area is present at that region.

At 424, the vehicle control module is configured to generate a camera lens dirt map according to the at least one blockage area. This camera lens dirt map may be used on its own to determine whether a lens obstruction is present, or may be combined with a camera lens dirt map based on a single static image as described in FIG. 2.

Figures 5A, 5B, 6A, 6B, 7A, 7B:
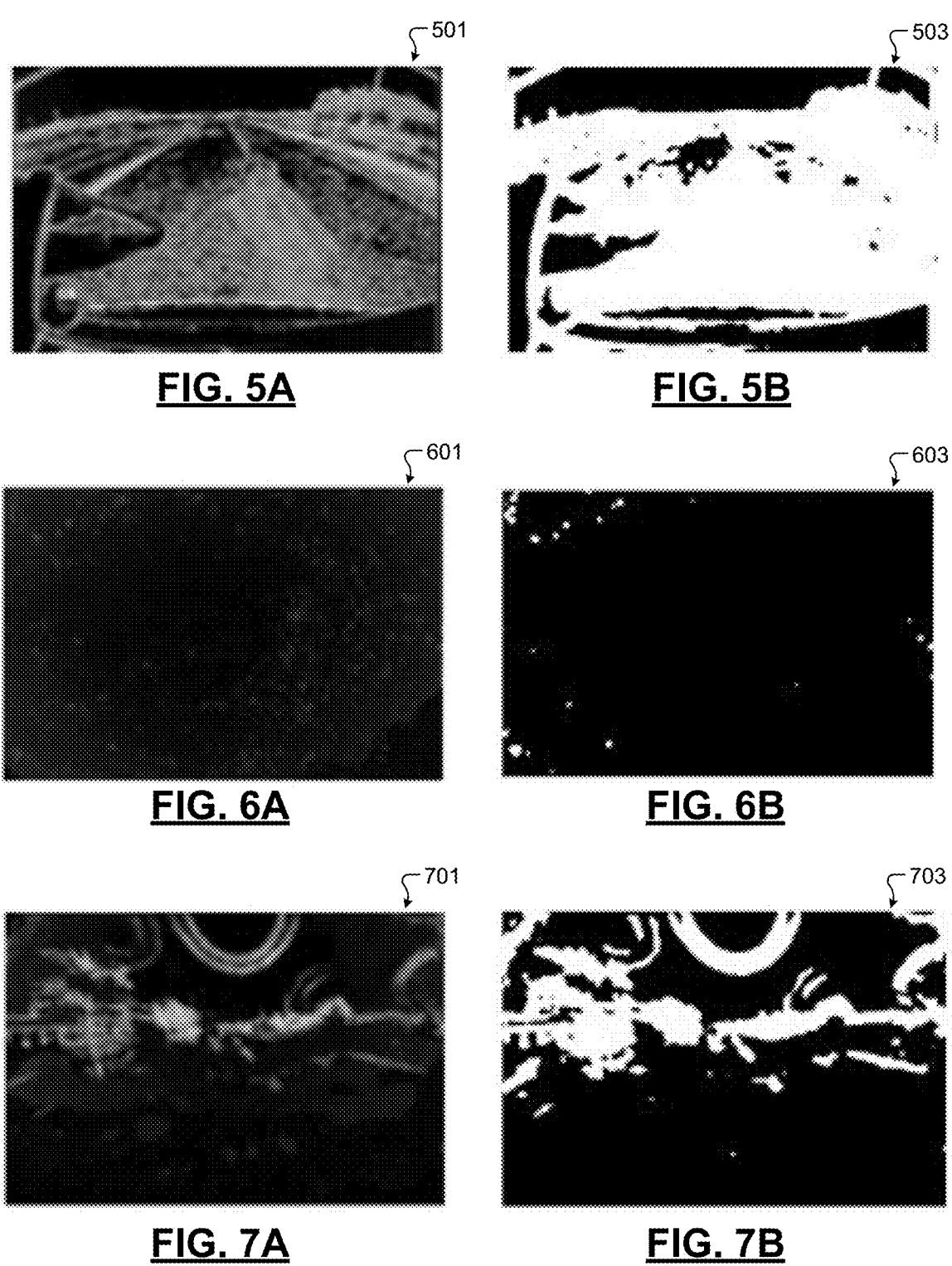
FIGS. 5A and 5B are example illustrations of an image information map and a valid perception region for a clear rear view camera lens.
FIGS. 6A and 6B are example illustrations of an image information map and a valid perception region for a completely blocked rear view camera lens.
FIGS. 7A and 7B are example illustrations of an image information map and a valid perception region for a partially blocked rear view camera lens.

FIGS. 5A and 5B are example illustrations of an image information map and a valid perception region for a clear rear view camera lens. As shown in FIG. 5A, in a clear camera view the image information map 501 includes a normal amount of pixel detail.

As shown in FIG. 5B, a corresponding valid perception region 503 indicates a large area of valid perception by the vehicle camera when the lens is clear. The valid perception region 503 may be determined by performing image processing on pixel data of the image information map 501.

FIGS. 6A and 6B are example illustrations of an image information map and a valid perception region for a completely blocked rear view camera lens. As shown in FIG. 6A, in a fully blocked lens view the image information map 601 includes substantially no pixel detail. As shown in FIG. 6B, a corresponding valid perception region 603 indicates hardly any areas of valid perception by the vehicle camera, when the lens is fully blocked.

FIGS. 7A and 7B are example illustrations of an image information map and a valid perception region for a partially blocked rear view camera lens. As shown in FIG. 7A, in a partially blocked lens view the image information map 701 includes some areas with a normal amount of pixel detail, and some areas with substantially no pixel detail. As shown in FIG. 7B, a corresponding valid perception region 703 indicates some areas of valid perception by the vehicle camera, but other areas without valid perception by the vehicle camera, when the lens is partially blocked.

The vehicle control module may be configured to determine whether a lens obstruction is present based on information from the processed valid perception regions. For example, the vehicle control module may determine the vehicle lens is fully clear when analyzing the valid perception region 503, may determine the vehicle lens is fully blocked when analyzing the valid perception region 603, and may determine a location of the partial lens obstruction based on analysis of the valid perception region 703.

Figure 8A:
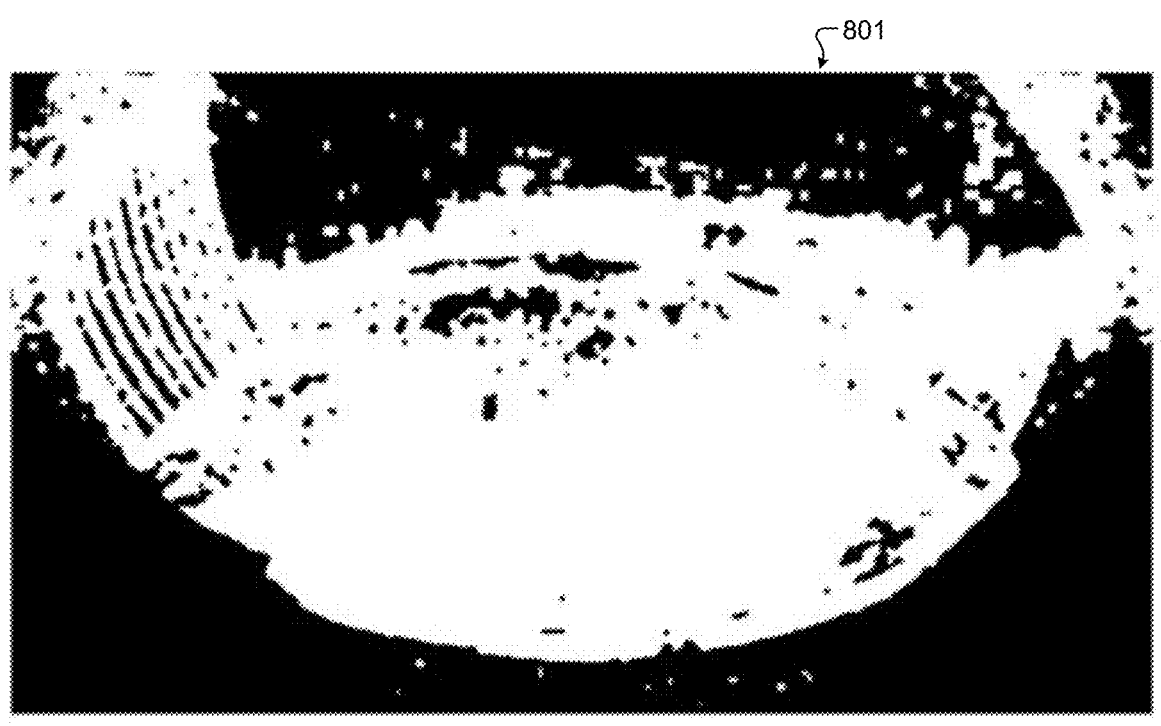
FIGS. 8A and 8B are example illustrations of a clear rear view camera lens and a partially blocked rear view camera lens.
Figure 8B:
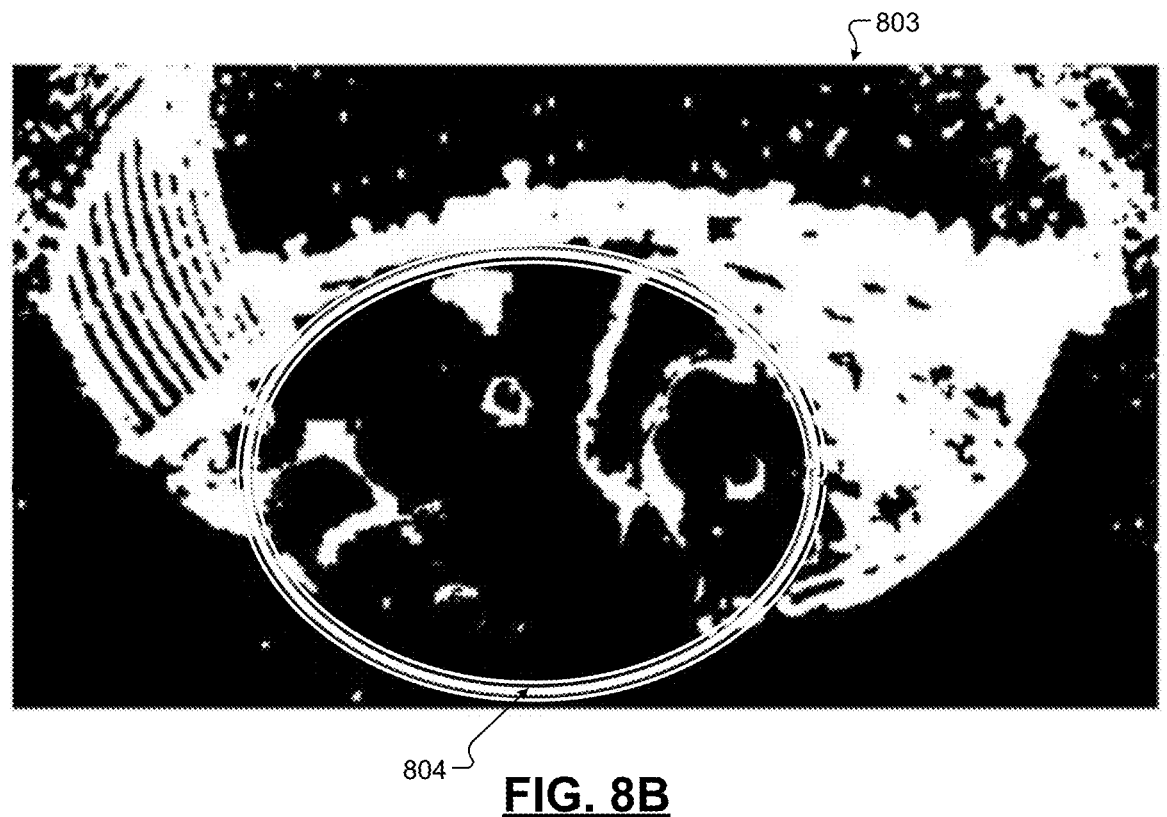

FIGS. 8A and 8B are example illustrations of a clear rear view camera lens and a partially blocked rear view camera lens. FIG. 8A illustrates a valid perception region 801 when the lens of the vehicle is clear. In contrast, the valid perception region 803 of FIG. 8B includes an identified blockage area 804. The vehicle control module may be configured to identify the area of the lens obstruction, and send a lens obstruction signal to other vehicle systems which rely on images or a specific region of images from the vehicle camera.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A method for processing vehicle camera lens obstructions, the method comprising:
obtaining an image from a vehicle camera;
generating a first camera lens dirt map according to pixel texture richness and color spectrum levels extracted from the image;
obtaining a sequential feed of multiple frames from the vehicle camera;
generating a second camera lens dirt map according to at least one salient region extracted from the multiple frames;
combining the first camera lens dirt map and the second camera lens dirt map to generate a combined camera lens dirt map; and
initiating at least one of automated lens cleaning or a camera lens obstruction signal, according to the combined camera lens dirt map.

2. The method of claim 1, wherein initiating automated lens cleaning includes at least one of dispensing a cleaning solution to a lens of the vehicle camera or moving a wiper across a surface of the lens.

3. The method of claim 1, wherein initiating the camera lens obstruction signal includes alerting at least one vehicle movement control system of an obstruction of a lens of the vehicle camera, to inhibit generation of at least one of automated vehicle braking or audible alerts according to input received from the vehicle camera.

4. The method of claim 1, further comprising:
extracting texture sub-areas of the image;
discretizing an image blurriness level according to the pixel texture richness of the texture sub-areas; and
extracting color spectrum sub-areas of the image,
wherein the first camera lens dirt map is generated by combining the image blurriness level and the color spectrum sub-areas.

5. The method of claim 1, further comprising:
extracting and tracking the at least one salient region in the multiple frames; and
detecting at least one blockage area of the vehicle camera according to the at least one salient region,
wherein the second camera lens dirt map is generated according to the at least one blockage area.

6. The method of claim 5, further comprising:
obtaining at least one vehicle motion signal; and
generating a timeline of pixel statistics in the multiple frames, according to the at least one vehicle motion signal,
wherein the at least one salient region is tracked according to the timeline of pixel statistics in the multiple frames, and
wherein at least one blockage area is detected according to the timeline of pixel statistics in the multiple frames.

7. The method of claim 5, wherein tracking the at least one salient region includes identifying a location in the multiple frames where detected objects repeatedly disappear during vehicle motion.

8. The method of claim 6, wherein the at least one vehicle motion signal includes at least one of a steering wheel rotation signal and a wheel speed sensor signal.

9. The method of claim 1, wherein combining the first camera lens dirt map and the second camera lens dirt map includes applying a weighted average to the first camera lens dirt map and the second camera lens dirt map to generate the combined camera lens dirt map.

10. The method of claim 1, wherein:
obtaining the image includes obtaining the image from a raw camera feed of the vehicle camera; and
generating the first camera lens dirt map includes generating an information map based on the image from the raw camera feed, and determining a valid perception region based on the information map.

11. The method of claim 1, wherein the vehicle camera comprises a rear vehicle backup camera.

12. A vehicle camera lens obstruction detection system comprising:
a vehicle camera mounted on a vehicle, the vehicle camera including a lens, and the vehicle camera configured to capture images; and
a vehicle control module in communication with the vehicle camera, the vehicle control module configured to:
receive a sequential feed of multiple frames from the vehicle camera;
obtain at least one vehicle motion signal;
generate a timeline of pixel statistics in the multiple frames, according to the at least one vehicle motion signal;
extract and track at least one salient region in the multiple frames according to the timeline of pixel statistics in the multiple frames;
detect at least one blockage area of the vehicle camera according to the at least one salient region and the timeline of pixel statistics in the multiple frames;
generate a camera lens dirt map according to the at least one blockage area; and
initiate at least one of automated lens cleaning or a camera lens obstruction signal, according to the camera lens dirt map.

13. The vehicle camera lens obstruction detection system of claim 12, wherein the vehicle control module is configured to track the at least one salient region by identifying a location in the multiple frames where detected objects repeatedly disappear during motion of the vehicle.

14. The vehicle camera lens obstruction detection system of claim 12, wherein the at least one vehicle motion signal includes at least one of a steering wheel rotation signal and a wheel speed sensor signal.

15. The camera vehicle lens obstruction detection system of claim 12, wherein initiating automated lens cleaning includes at least one of dispensing a cleaning solution to a lens of the vehicle camera or moving a wiper across a surface of the lens.

16. The camera vehicle lens obstruction detection system of claim 12, wherein initiating the camera lens obstruction signal includes alerting at least one vehicle movement control system of an obstruction of a lens of the vehicle camera, to inhibit generation of at least one of automated vehicle braking or audible alerts according to input received from the vehicle camera.

17. The camera vehicle lens obstruction detection system of claim 12, wherein the vehicle camera comprises a rear vehicle backup camera.

18. A vehicle camera lens obstruction detection system comprising:
a vehicle camera mounted on a vehicle, the vehicle camera including a lens, and the vehicle camera configured to capture images; and a vehicle control module in communication with the vehicle camera, the vehicle control module configured to:

receive an image from the vehicle camera;

extract texture sub-areas of the image;

discretize an image blurriness level according to pixel texture richness of the texture sub-areas;

extract color spectrum sub-areas of the image;

generate a camera lens dirt map according to the pixel texture richness of the texture sub-areas and the color spectrum sub-areas of the image; and initiate at least one of automated lens cleaning or a camera lens obstruction signal, according to the camera lens dirt map.

19. The vehicle camera lens obstruction detection system of claim 18, wherein:

initiating automated lens cleaning includes at least one of dispensing a cleaning solution to a lens of the vehicle camera or moving a wiper across a surface of the lens; and initiating the camera lens obstruction signal includes alerting at least one vehicle movement control system of an obstruction of a lens of the vehicle camera, to inhibit generation of at least one of automated vehicle braking or audible alerts according to input received from the vehicle camera.

20. The camera vehicle lens obstruction detection system of claim 18, wherein the vehicle camera comprises a rear vehicle backup camera.

* * * * *